(12) United States Patent
Cheng et al.

(10) Patent No.: US 8,737,471 B2
(45) Date of Patent: May 27, 2014

(54) VIDEO DECODING DEVICE

(75) Inventors: Fan-Chieh Cheng, Keelung (TW);
Shih-Chia Huang, Taipei (TW); Sy-Yen Kuo, Taipei (TW)

(73) Assignee: Acer Incorporated, Hsichih (TW)

( * ) Notice: Subject to any disclaimer, the term of this patent is extended or adjusted under 35 U.S.C. 154(b) by 740 days.

(21) Appl. No.: 12/947,241

(22) Filed: Nov. 16, 2010

(65) Prior Publication Data

US 2011/0194601 A1    Aug. 11, 2011

(30) Foreign Application Priority Data

Feb. 5, 2010 (TW) .............................. 99103489 A

(51) Int. Cl.
*H04N 7/12* (2006.01)

(52) U.S. Cl.
USPC ............................... 375/240.12; 375/240.25

(58) Field of Classification Search
USPC ....................................... 375/240.12, 240.25
See application file for complete search history.

(56) References Cited

U.S. PATENT DOCUMENTS

| | | | |
|---|---|---|---|
| 5,714,952 A * | 2/1998 | Wada | 341/94 |
| 5,854,799 A | 12/1998 | Okada et al. | |
| 7,693,345 B2 * | 4/2010 | Pore et al. | 382/275 |
| 8,170,124 B2 * | 5/2012 | Huang et al. | 375/240.27 |
| 2003/0147469 A1 * | 8/2003 | Byun | 375/240.25 |
| 2009/0175344 A1 | 7/2009 | Wu et al. | |

FOREIGN PATENT DOCUMENTS

| | | |
|---|---|---|
| EP | 1628488 A2 | 2/2006 |
| WO | 2005/027495 A2 | 3/2005 |

OTHER PUBLICATIONS

Office Action mailed Jun. 5, 2012 in counterpart Chinese Application No. 201010114293.8.
Office Action mailed Jun. 28, 2013 in counterpart Taiwanese Application No. 10-220859790.

* cited by examiner

*Primary Examiner* — Anner Holder
(74) *Attorney, Agent, or Firm* — Snell & Wilmer L.L.P.

(57) ABSTRACT

A video decoding device is provided. The device includes an error checking unit and a decoding unit. The error checking unit checks the error state of a video data, so as to produce an error information. Then, the decoding unit selectively performs an error concealment process and a decoding process for the video data according to the error information. The video decoding device of the present invention can perform error checking process, error concealment process, and video decoding process for the video data.

16 Claims, 2 Drawing Sheets

PRIOR ART

US 8,737,471 B2

VIDEO DECODING DEVICE

CROSS REFERENCE TO RELATED APPLICATIONS

This application claims priority to Taiwan Application No. 99103489 entitled "Video Decoding Device" filed on Feb. 5, 2010, which application is incorporated herein by reference.

BACKGROUND OF THE INVENTION

1. Technical Field

The present invention relates to a video decoding device, and more particularly, to a video decoding device having an error checking unit configured for providing an error information to assist in decoding video data.

2. Description of Related Art

A conventional video decoding device performs an error checking process, an error concealment process, and a video decoding process on video data, using a single circuit functional unit. However, the conventional video decoding device, which performs an error checking process, an error concealment process, and a video decoding process on the video data in sequence, using the same circuit functional unit, is not capable of processing a plurality of pictures simultaneously and thus is not effective in decoding.

Furthermore, if an error arises from an error checking process, an error concealment process, and a video decoding process performed by a single circuit functional unit of the conventional video decoding device, the subsequent decoding of the video data will be jeopardized, or will even cause the crash of the video decoding device. On the other hand, given a plenty of functions required for a single circuit functional unit of the conventional decoding device, not only is circuit design complex, but the flexibility of circuit modification is subjected to a limitation to some extent.

In view of this, it is imperative to put forth a modular video decoding device for performing an error checking process on a portion of the image data processing and performing an error concealment process and a video decoding process on the other portion of the image data processing concurrently so as to enhance the efficiency of image decoding and ensure the flexibility of design.

BRIEF SUMMARY OF THE INVENTION

It is a primary objective of the present invention to provide a modular video decoding device for performing an error checking process, an error concealment process, and a video decoding process on video data.

In an embodiment of the present invention, a video decoding device for decoding video data is provided, the device comprising:

an error checking unit for generating an error information according to an error status of the video data; and a decoding unit coupled to the error checking unit for selectively performing an error concealment process and a decoding process on the video data according to the error information.

DETAILED DESCRIPTION OF THE INVENTION

Figure 1:
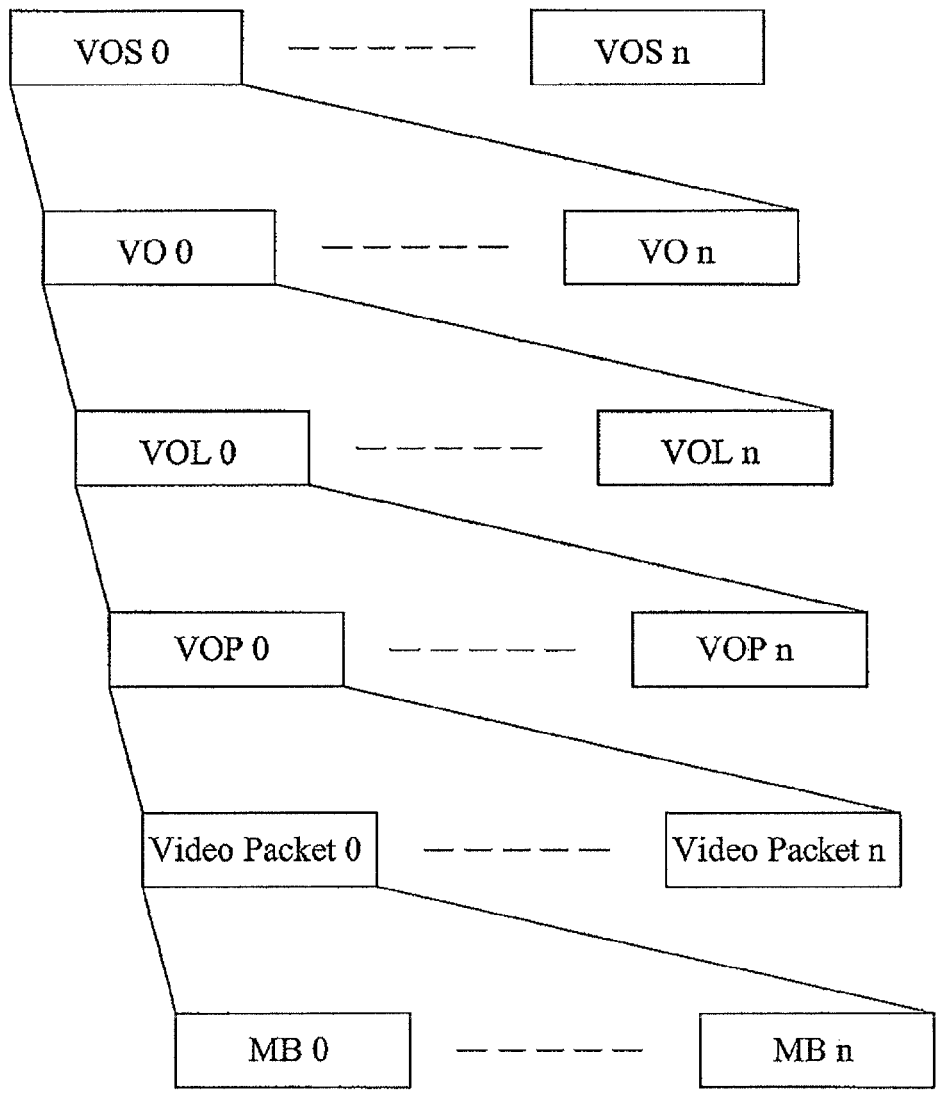
FIG. 1 shows conventional image data bitstream layers.

Referring to FIG. 1, there are shown conventional image data bitstream layers, wherein the format of the image data is MPEG4 compression standards. As shown in the drawing, MPEG4 defines different video encoding layers comprising: a video object sequence (VOS) including all video objects (VO) constructing a complete video picture. Each of the video objects (VO) is one of the objects in a picture. Beneath the video object (VO) is a video object layer (VOL) for determining whether to perform scalable encoding or non-scalable encoding on the video object (VO). Regarding the MPEG4-based encoding layers, the encoding data in the video object sequence (VOS), video object (VO), and the video object layer (VOL) is applicable to the data of all the pictures in the video data. Beneath the video object layer (VOL) is a video object plane (VOP) serving as a sample of the video objects (VO) at a specific point in time and including data related to motion, shape, and image texture. Regarding the MPEG4-based encoding layers, the encoding data in the video object plane (VOP) is applicable to the data of a single picture in the video data. Beneath the video object plane (VOP) is a video packet including an integral number of macroblocks (MB), wherein the encoding data in the video packet is applicable to a plurality of said macroblocks in the data of a single picture, as far as the MPEG4-based encoding layers are concerned. Each of the macroblocks comprises four luminance blocks and two chrominance blocks not shown in FIG. 1.

To protect the video data from transmission-related errors, MPEG4 further provides four tools of error resilience coding, namely resynchronization marker, data partition, reverse variable length coding (RVLC), and header extended code (HEC). The resynchronization marker enables resynchronization whenever an error occurs between the decoding end and the encoding end. Data partition is configured to put data of different attributes at different positions, so as to mitigate the effect of an error. Reverse variable length coding (RVLC) is configured to add specific prefixes and suffixes to data, so as for the data to be reversely decoded to thereby reduce errors. Header extended code (HEC) provides a mark for indicating that a backup header is available to the video packet.

Figure 2:
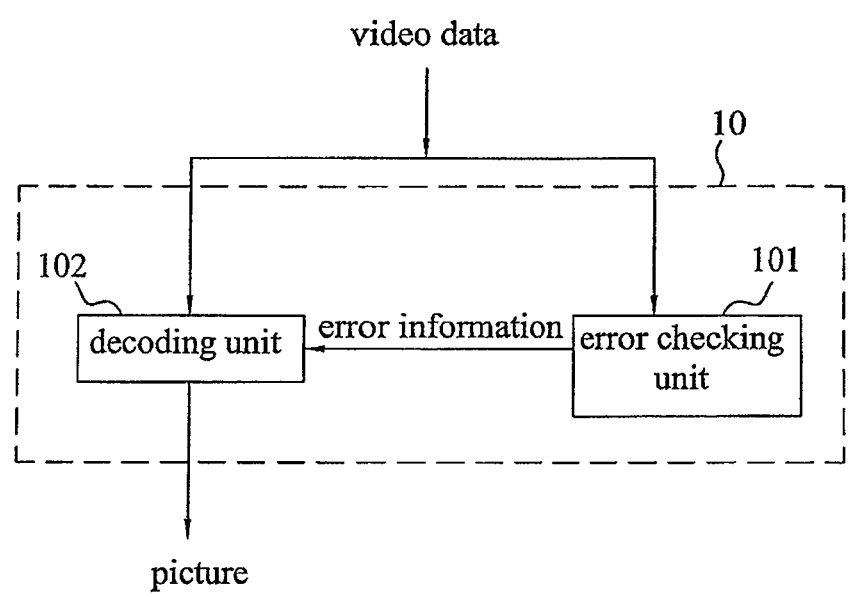
FIG. 2 shows a video decoding device in an embodiment of the present invention.

Referring to FIG. 2, there is shown a video decoding device 10 in an embodiment of the present invention. The video decoding device 10 comprises an error checking unit 101 and a decoding unit 102 for decoding video data. After the video decoding device 10 has received the video data, the error checking unit 101 generates an error information according to an error status of the video data. The error checking unit 101 classifies error statuses frequently seen among the video data. For example, error statuses are classified, according to video encoding layers of video compression standards, as: coding data errors of the data of all the pictures in the video data, coding data errors of the data of a single picture, and coding data errors of the macroblocks. Furthermore, the error checking unit 101 further identifies and determines whether the video data is encoded by an error resilience coding tool that conforms with video compression standards, so as to determine whether to provide more error information. In an embodiment of the present invention, the error checking unit 101 provides error information of different degrees according to a user's configuration and an error status. For example, the user may set the error information in such a manner that the error checking unit 101 provides an error information whose basic unit is limited to a single picture, or provides an error information whose basic unit is limited to a single macroblock.

After receiving the error information, the decoding unit 102 electrically coupled to the error checking unit 101 selectively performs an error concealment process and a decoding process on the video data according to the error information. For example, the decoding unit 102 identifies and determines whether to perform the error concealment process and the decoding process on the video data thus received according to a specific field of the error information. If the decoding unit 102 determines that the error concealment process and the decoding process can be performed, the error concealment process replaces the error data of the video data with a substitute data according to an encoding format of one encoding layer of the video data and the error information.

The error concealment process is configured to identify and determine whether the encoding format of one encoding layer of the video data is intra-coding or inter prediction coding, so as to determine whether to replace the error data of the video data with a substitute data. The encoding layers may comprise data of all the pictures, data of a single picture, or data of a single macroblock, and are exemplified by the encoding layers of MPEG4 compression standards, as shown in FIG. 1. Afterward, the decoding unit 102 decodes the video data to generate a picture, using a conventional decoding method.

The present invention is hereunder illustrated with an embodiment in accordance with MPEG4 compression standards. After the video decoding device 10 has received a video data that conforms to MPEG4 compression standards, the error checking unit 101 generates an error information according to an error status of the video data.

Table 1 shows error statuses identified, contents of error information recorded, and the ensuing steps taken by the error checking unit 101. In addition, in another embodiment of the present invention, the error checking unit 101 further identifies and determines whether the video data have the data partition format and reverse variable length coding (RVLC) format provided by MPEG4 compression standards, so as to provide more fields in the error information and thereby enable the decoding unit 102 to retain more encoding data in the video data according to the fields in order to perform error concealment.

An error status is associated with any of the following categories: an encoding data error of all the picture data in the video data (for example, scenarios a and b described in Table 1), an encoding data error of a single picture data (for example, scenario c described in Table 1), and an encoding data error of the macroblocks (for example, scenarios d, e, f, and g described in Table 1). For example, losing a video object sequence (VOS) header, losing a video object (VO) header, or losing a video object layer (VOL) header to thereby affect the encoding configuration of all the picture data in the video data, that is, scenario a described in Table 1. For example, the scenario where the macroblocks have a variable length code (VLC) not conforming with a variable length coding table (VLC table) to thereby affect the encoding configuration of the macroblocks only, that is, scenario d described in Table 1.

TABLE 1

| Error Status | Error Information | The next step taken by the error checking unit 101 |
| --- | --- | --- |
| scenario a: losing the video object sequence (VOS) header, video object (VO) header, or video object layer (VOL) header | an error information records damage of a video data in its entirety | search for the next video object sequence (VOS) header, video object (VO) header, or video object layer (VOL) header |
| scenario b: video object layer (VOL) header: width or height of a picture is not multiples of 4 pixels | an error information records damage of a video data in its entirety | search for the next video object sequence (VOS) header, video object (VO) header, or video object layer (VOL) header |
| scenario c: losing video object plane (VOP) header | an error information records damage of a video object plane (VOP) in its entirety | search for the next video object plane (VOP) header |
| scenario d: having a variable length code (VLC) not conforming with a variable length coding table (VLC table) scenario e: having more than 64 DCT coefficients scenario f: losing resynchronization marker | an error information records an error video object plane (VOP) number, an error macroblock number, and the first ensuing correct macroblock number | search for the next video object plane (VOP) header or video packet header |

TABLE 1-continued

| Error Status | Error Information | The next step taken by the error checking unit 101 |
| --- | --- | --- |
| scenario g:<br>video packet header info not conforming with a video object plane (VOP), including:<br>1. having macroblocks more than (VOP_WIDTH/16)* (VOP_HEIGHT/16)<br>2. having a macroblock number smaller than a decoded macroblock number<br>3. video packet header info not conforming with a video object plane (VOP) in terms of a quantifying parameter (QP);<br>4. a video object plane (VOP) header not conforming with a video object plane (VOP) coding type;<br>5. a video object plane (VOP) header not conforming with INTRA_DC_VLC_THR;<br>6. a video object plane (VOP) header not conforming with VOP_FCODE_FORWARD<br>7. a video object plane (VOP) header not conforming with VOP_FCODE_BACKWARD<br>8. header extended code (HEC) error including a time stamp | an error information records an error video object plane (VOP) number, an error macroblock number, and the first ensuing correct macroblock number | search for the next video object plane (VOP) header or video packet header |

Notations shown in Table 1 are concisely described hereunder. VOP_WIDTH and VOP_HEIGHT denote the width and height of a video object plane (VOP), respectively. A quantifying parameter (QP) is configured to quantify the image data. INTRA_DC_VLC_THR is configured to switch to the mode of variable length coding (VLC). VOP_FCODE_FORWARD and VOP_FCODE_BACKWARD are configured to decode a motion vector. Notations shown in Table 1 are in wide use with MPEG4 compression standards and thus are comprehensible to persons skilled in the art; hence, a detailed description of the notations shown in Table 1 is omitted. Also, Table 1 is illustrative of part of the embodiments of the present invention rather than restrictive of the present invention.

After the error checking unit 101 has sent an error information to the decoding unit 102, the next step corresponding to the error status is taken according to Table 1. For example, if the error checking unit 101 identifies and determines that an error status is scenario g, that is, a video packet header info does not conform with a video object plane (VOP), the error checking unit 101 will, after generating an error information, search for the next video object plane (VOP) header or video packet header to identify and determine whether it has an error status.

According an error status identified, an error information at least comprises:

a valid bit for indicating whether the video data can be decoded;

a video object plane (VOP) number for indicating a video object plane;

an error macroblock number for indicating a first error macroblock;

a correct macroblock number for indicating a first correct macroblock right after the first error macroblock; and an error information ending value for indicating the ending of the error information.

The error checking unit 101 checks the encoding data in the video data to determine whether the encoding data has an error status described in Table 1, for example, and thereby records information, such as a video object plane (VOP) number, an error macroblock number, and a correct macroblock number, as well. A valid bit of 1 indicates that an error concealment process can be performed on the video data according to the video object plane (VOP) number, the error macroblock number, and the correct macroblock number. A valid bit of 0 indicates that the video data has a severe error, such as losing a video object sequence (VOS) header, a video object (VO) header, or a video object layer (VOL) header, that is, scenario a, or erroneous contents of a video object layer (VOL) header, that is, scenario b, as described in Table 1, and thus error concealment cannot be performed on the video data involving the four aforesaid types of headers, nor can the video data be decoded by the decoding unit 102.

Furthermore, if the error checking unit 101 identifies and determines that the video data has the data partition format and reverse variable length coding (RVLC) format provided by MPEG4 compression standards, the error information further comprises:

a slice drop value for indicating that a slice is dropped.

According to MPEG4 compression standards, a picture comprises a plurality of slices each having a plurality of macroblocks. A slice drop value of 1 indicates that the error checking unit 101 determines, during a process of identifying an error status, that the encoding data of all the macroblocks in a slice is erroneous, and thus the encoding data of the slice is not used in the error concealment process. A slice drop value of 0 indicates that a portion of the encoding data of macroblocks in the slice can be used in the error concealment process.

The decoding unit 102 electrically coupled to the error checking unit 101 selectively performs an error concealment process and a decoding process on the video data according to the error information. A valid bit field of the error information is configured to determine whether to perform the error concealment process and the decoding process on the video data. If the decoding unit 102 determines that the error concealment process and the decoding process can be performed, the error concealment process will replace the error data of the video data with a substitute data according to an encoding format of one encoding layer of the video data and the error information. For example, the decoding unit 102 identifies the encoding format, by decoding the header of the encoding layer. In an embodiment of the present invention, the decoding unit 102 identifies and determines whether an encoding format of one encoding layer of a video object plane (VOP) is intra-coding or inter prediction coding.

In four embodiments of the present invention, the decoding unit 102 replaces the error data with a substitute data in a manner described hereunder.

Firstly, if the encoding format of the encoding layer of the video data is intra-coding, the decoding unit 102 generates a substitute data to replace the error data without referring to other pictures. For example, if, when the present invention is applied to the image data that conform with MPEG4 compression standards, the encoding layer of the video data is a video object plane (VOP) and the encoding format of the encoding layer is an intra-video object plane (INTRA VOP), the decoding unit 102, referring to a video object plane (VOP) number, an error macroblock number, and a correct macroblock number of the error information, replaces the error data of macroblocks, using information comprising:

(1) setting MB_TYPE to MODE_INTRA;
(2) setting AC_PRED_FLAG to 0;
(3) setting code block pattern (CBP) to 0; and
(4) setting DC coefficient to 0.

MB_TYPE denotes a type of macroblocks. Setting MB_TYPE to MODE_INTRA means setting the macroblocks to an intra-coding mode. AC_PRED_FLAG denotes whether a macroblock undergoes prediction of the AC coefficient. AC_PRED_FLAG is set to 0 for indicating that the macroblock does not undergo prediction of the AC coefficient. Code block pattern (CBP) indicates whether the four luminance blocks and two chrominance blocks corresponding to the macroblocks have the DC coefficient and the AC coefficient. Code block pattern (CBP) is set to 0 for indicating that a block corresponding to the CBP of 0 does not have the DC coefficient and the AC coefficient.

Secondly, the decoding unit 102, referring to other pictures, generates the substitute data to replace said error data, if the encoding format of the encoding layer of the video data is inter prediction coding. For example, if, when the present invention is applied to the image data that conform with MPEG4 compression standards, the encoding layer of the video data is a video object plane (VOP) and the encoding format of the encoding layer is an inter prediction video object plane (VOP) (inter prediction VOP), the decoding unit 102, referring to a video object plane (VOP) number, an error macroblock number, and a correct macroblock number of the error information, replaces the error data of macroblocks, using information comprising:

(1) setting NOT_CODED to 1.

NOT_CODED indicates whether macroblocks are encoded. A NOT_CODED of 1 indicates that the macroblocks refers to another picture data by a motion vector of 0 and lacks any data related to the DC coefficient.

Thirdly, the decoding unit 102 retains parts of encoding data of the video data and generates the substitute data to replace the error data without referring to other pictures, if the video data is encoded by error resilience coding so as for the error data to have more fields (For example, the aforesaid slice drop value) and the encoding format of the encoding layer of the video data is intra-coding. For example, when the present invention is applied to the image data that conform with MPEG4 compression standards, if the video data has a data partition format and a reverse variable length coding (RVLC) format to thereby allow an error information to have a slice drop value field, with the encoding layer being a video object plane (VOP) and having an encoding format of an intra-video object plane (INTRA VOP), the decoding unit 102, referring to a video object plane (VOP) number, an error macroblock number, a correct macroblock number, and a slice drop value of the error information, replaces the error data of macroblocks, using information comprising:

(1) setting AC_PRED_FLAG to 0;
(2) setting code block pattern (CBP) to 0; and
(3) retaining the DC coefficient and MCBPC information, if no error previously occurs to DC_MARKER used in marking off the encoding data, wherein the MCBPC information denotes the types of macroblocks and patterns of chrominance coding blocks.

Fourthly, the decoding unit 102, retaining parts of encoding data of the video data and referring to other pictures, generates the substitute data to replace the error data, if the video data is encoded by error resilience coding to thereby enable the error information to include more fields and the encoding format of the encoding layer of the video data is inter prediction coding. For example, if, when the present invention is applied to the image data that conform with MPEG4 compression standards, the video data has the data partition format and reverse variable length coding (RVLC) format to thereby allow the error information to include a slice drop value field, with the encoding layer being a video object plane (VOP) and having an encoding format of an inter prediction video object plane (inter prediction VOP), the decoding unit 102, referring to a video object plane (VOP) number, an error macroblock number, a correct macroblock number, and a slice drop value in the error information, replaces the error data of macroblocks, using information comprising:

(1) setting NOT_CODED to 1;
(2) setting code block pattern (CBP) to 0; and
(3) retaining the MCBPC information, NOT_CODED, and a motion vector, if no error previously occurs to MOTION_MARKER used in marking off the encoding data.

As disclosed above, regarding the video decoding device 10 provided by the present invention, the error checking unit 101 checks an error status of the video data and generates an error information. Then, the decoding unit 102 performs a corresponding error concealment process on the video data according to the error information. The video decoding device 10 of the present invention performs an error checking process on a portion of the video data and performs the error concealment process and a video decoding process on the other portion of the video data concurrently. Also, users can flexibly modify the error checking process of the error checking unit 101 in accordance with different video compression standards, for example, identifying other types of error statuses or providing the error information that carries more information. Likewise, users can flexibly modify the error concealment process of the decoding unit 102 in accordance with different video compression standards, for example, replacing the error data with another substitute data.

The foregoing preferred embodiments are provided to illustrate the present invention and are not intended to be restrictive of the scope of the present invention. Hence, all equivalent modifications and variations made to the foregoing embodiments without departing from the spirit embodied in the disclosure of the present invention should fall within the appended claims of the invention.

What is claimed is:

1. A video decoding device for decoding video data, said device comprising:
    an error checking unit for generating an error information according to an error status of said video data; and
    a decoding unit, coupled to said error checking unit, for selectively performing an error concealment process and a decoding process for said video data according to said error information;
    wherein said decoding unit withholds said error concealment process and said decoding process, if said error status becomes at least one of the followings: losing video object sequence header, losing video object header, losing video object layer header, or that width or height of picture of video object layer header is not multiples of 4 pixels.

2. The video decoding device according to claim 1, wherein said decoding unit performs said error concealment process and said decoding process, if said error status becomes at least one of the followings: having a variable length code (VLC) not conforming with a VLC table, having more than 64 DCT coefficients, losing resynchronization marker, or video packet header info not conforming with a video object plane.

3. The video decoding device according to claim 1, wherein said error information comprising:
    a valid bit for indicating whether said video data can be decoded;
    a video object plane number for indicating a video object plane;
    an error macroblock number for indicating a first error macroblock;
    a correct macroblock number for indicating a first correct macroblock right after said first error macroblock; and
    an error information ending value for indicating the ending of said error information.

4. The video decoding device according to claim 3, wherein said error information further comprising:
    a slice drop value for indicating that a slice is dropped.

5. The video decoding device according to claim 3, wherein said error concealment process replaces an error data of said video data with a substitute data, according to an encoding format of one encoding layer of said video data and said error information.

6. The video decoding device according to claim 5, wherein said decoding unit generates said substitute data to replace said error data without referring to other pictures, if said encoding format of said encoding layer of said video data is intra-coding.

7. The video decoding device according to claim 5, wherein said decoding unit, referring to other pictures, generates said substitute data to replace said error data, if said encoding format of said encoding layer of said video data is inter prediction coding.

8. The video decoding device according to claim 5, wherein said decoding unit, retaining parts of encoding data of said video data, generates said substitute data to replace said error data without referring to other pictures, if said video data is encoded by error resilience coding and said encoding format of said encoding layer of said video data is intra-coding.

9. The video decoding device according to claim 5, wherein said decoding unit, retaining parts of encoding data of said video data and referring to other pictures, generates said substitute data to replace said error data, if said video data is encoded by error resilience coding and said encoding format of said encoding layer of said video data is inter prediction coding.

10. A video decoding method for decoding video data, said method comprising the steps of:
    (a) generating an error information according to an error status of said video data; and
    (b) selectively performing an error concealment process and a decoding process for said video data according to said error information;
    wherein said step (b) further comprises withholding said error concealment process and said decoding process, if said error status becomes at least one of the followings: losing video object sequence header, losing video object header, losing video object layer header, or that width or height of picture of video object layer header is not multiples of 4 pixels.

11. The video decoding method according to claim 10, wherein said step (b) further comprises performing said error concealment process and said decoding process, if said error status becomes at least one of the followings: having a variable length code (VLC) not conforming with a VLC table, having more than 64 DCT coefficients, losing resynchronization marker, or video packet header info not conforming with a video object plane.

12. The video decoding method according to claim 10, wherein said error concealment process replaces an error data of said video data with a substitute data, according to an encoding format of one encoding layer of said video data and said error information.

13. The video decoding method according to claim 12, further comprises generating said substitute data to replace said error data without referring to other pictures, if said encoding format of said encoding layer of said video data is intra-coding.

14. The video decoding method according to claim 12, further comprises generating said substitute data to replace said error data with referring to other pictures, if said encoding format of said encoding layer of said video data is inter prediction coding.

15. The video decoding method according to claim 12, further comprises retaining parts of encoding data of said video data and generating said substitute data to replace said error data without referring to other pictures, if said video data is encoded by error resilience coding and said encoding format of said encoding layer of said video data is intra-coding.

16. The video decoding method according to claim 12, further comprises retaining parts of encoding data of said video data and generating said substitute data to replace said error data with referring to other pictures, if said video data is encoded by error resilience coding and said encoding format of said encoding layer of said video data is inter prediction coding.

* * * * *